(12) United States Patent
Lin

(10) Patent No.: US 8,186,017 B2
(45) Date of Patent: May 29, 2012

(54) TRANSVERSE-POSITIONING HINGE

(75) Inventor: Zion Lin, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 403 days.

(21) Appl. No.: 12/567,836

(22) Filed: Sep. 28, 2009

(65) Prior Publication Data
US 2011/0072616 A1    Mar. 31, 2011

(51) Int. Cl.
*E05D 11/10* (2006.01)
(52) U.S. Cl. ............................. 16/334; 16/367; 16/371
(58) Field of Classification Search .............. 16/367, 16/371, 374, 297, 334, 337, 342; 379/433.13; 361/679.06, 679.27; 248/923; 455/575.3
See application file for complete search history.

(56) References Cited

U.S. PATENT DOCUMENTS

| | | | |
|---|---|---|---|
| 7,440,783 B2 * | 10/2008 | Hyun | 455/575.3 |
| 7,526,835 B2 * | 5/2009 | Chen | 16/367 |
| 7,614,119 B2 * | 11/2009 | Hsu | 16/367 |
| 7,621,021 B2 * | 11/2009 | Hsu et al. | 16/367 |
| 7,735,197 B2 * | 6/2010 | Chien | 16/337 |
| 7,743,468 B2 * | 6/2010 | Chang et al. | 16/374 |
| 2007/0119024 A1 * | 5/2007 | Kim | 16/337 |

* cited by examiner

*Primary Examiner* — William L. Miller
(74) *Attorney, Agent, or Firm* — Frenkel & Associates, P.C.

(57) ABSTRACT

A transverse-positioning hinge has a seat, at least one elastic ball, a shaft and a fastening washer. The elastic ball is mounted in the seat. The shaft is mounted through the seat and has at least one positioning detent selectively engaging the elastic ball. The fastening washer is attached to the end of the shaft. Adjusting the tightness for attaching the fastening washer changes the deformation of the elastic ball, and then the resilient force provided by the elastic ball is also adjusted. Therefore, the positioning force provided by the elastic ball is adjustable without changing the elastic ball.

19 Claims, 5 Drawing Sheets

TRANSVERSE-POSITIONING HINGE

BACKGROUND OF THE INVENTION

1. Field of the Invention

The present invention relates to a transverse-positioning hinge, especially to a hinge that allows a cover to rotate relative to a base of an electronic device.

2. Description of the Prior Arts

A conventional rotatable hinge provides an axial positioning function and has two positioning washers and a resilient washer. The positioning washers are rotated relative to each other and have corresponding recesses and protrusions. The resilient washer is wavy and pushes the positioning washers against each other to provide positioning function while the recesses and protrusions engage each other. However, the positioning force is determined by coefficient of elasticity. When the convention rotatable hinge is provided for different electronic devices that need different positioning forces, the resilient washer needs to be changed to provide different positioning forces. The producer needs to manufacture multiple different resilient washers with different coefficient of elasticity. Therefore, different manufacturing procedures are required so a manufacturing cost is high.

To overcome the shortcomings, the present invention provides a transverse-positioning hinge to mitigate or obviate the aforementioned problems.

SUMMARY OF THE INVENTION

The main objective of the present invention is to provide a transverse-positioning hinge with easily adjusted positioning force. The transverse-positioning hinge has a seat, at least one elastic ball, a shaft and a fastening washer. The elastic ball is mounted in the seat. The shaft is mounted through the seat and has at least one positioning detent selectively engaging the elastic ball. The fastening washer is attached to the end of the shaft. Adjusting the tightness for attaching the fastening washer changes the deformation of the elastic ball, and then the resilient force provided by the elastic ball is also adjusted. Therefore, the positioning force provided by the elastic ball is adjustable without changing the elastic ball.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
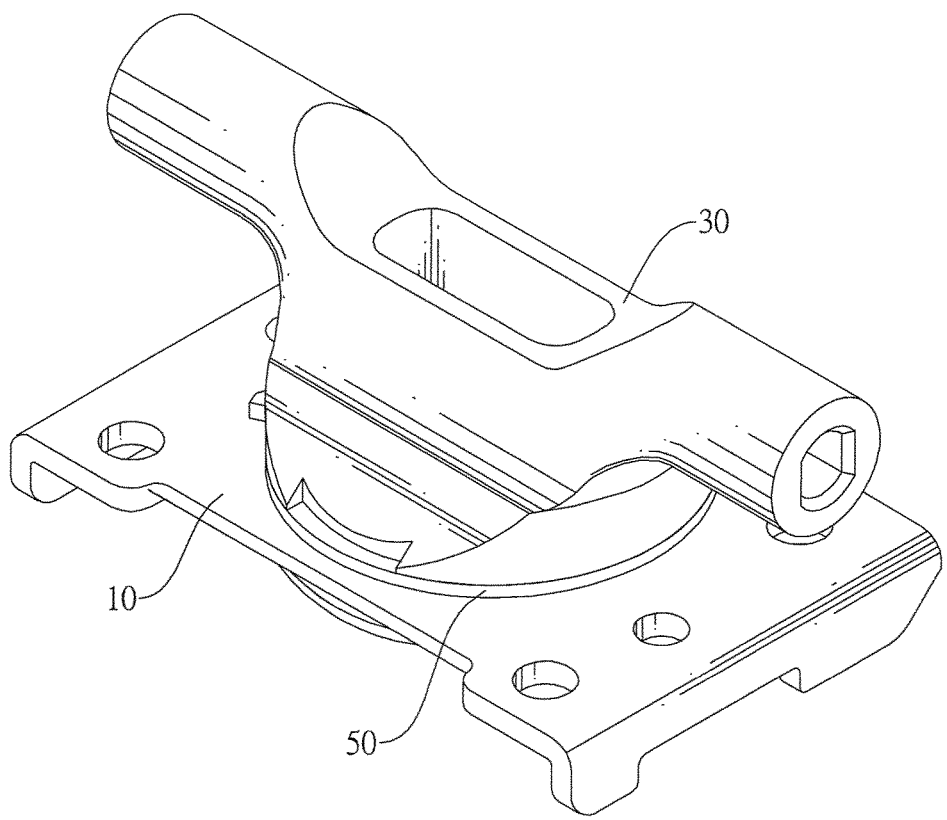
FIG. 1 is a perspective view of a transverse-positioning hinge in accordance with the present invention.
Figure 2:
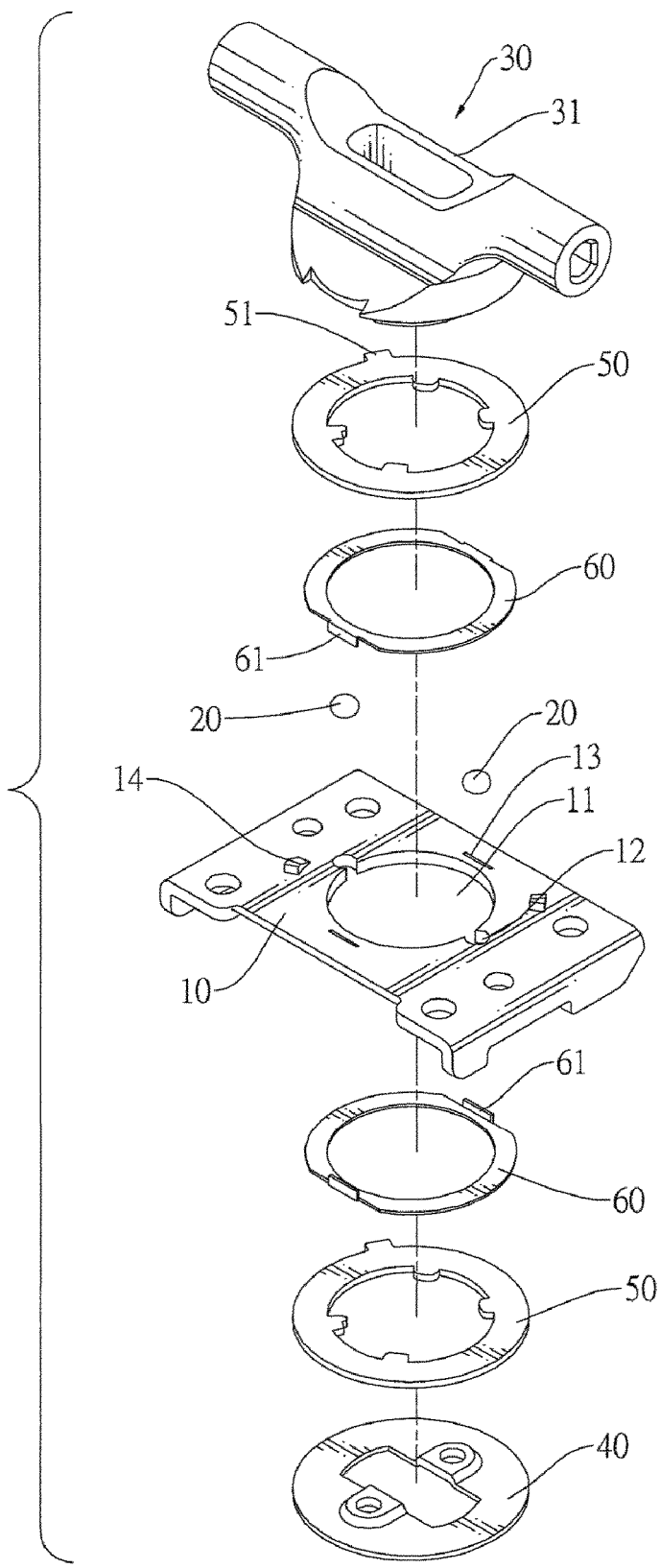
FIG. 2 is an exploded perspective view of the transverse-positioning hinge in FIG. 1.

With reference to FIGS. 1 and 2, a transverse-positioning hinge in accordance with the present invention comprises a seat (10), a central bracket (30), two elastic balls (20), a fastening washer (40), two abrasion washers (50) and two pressed washers (60).

Figure 3:
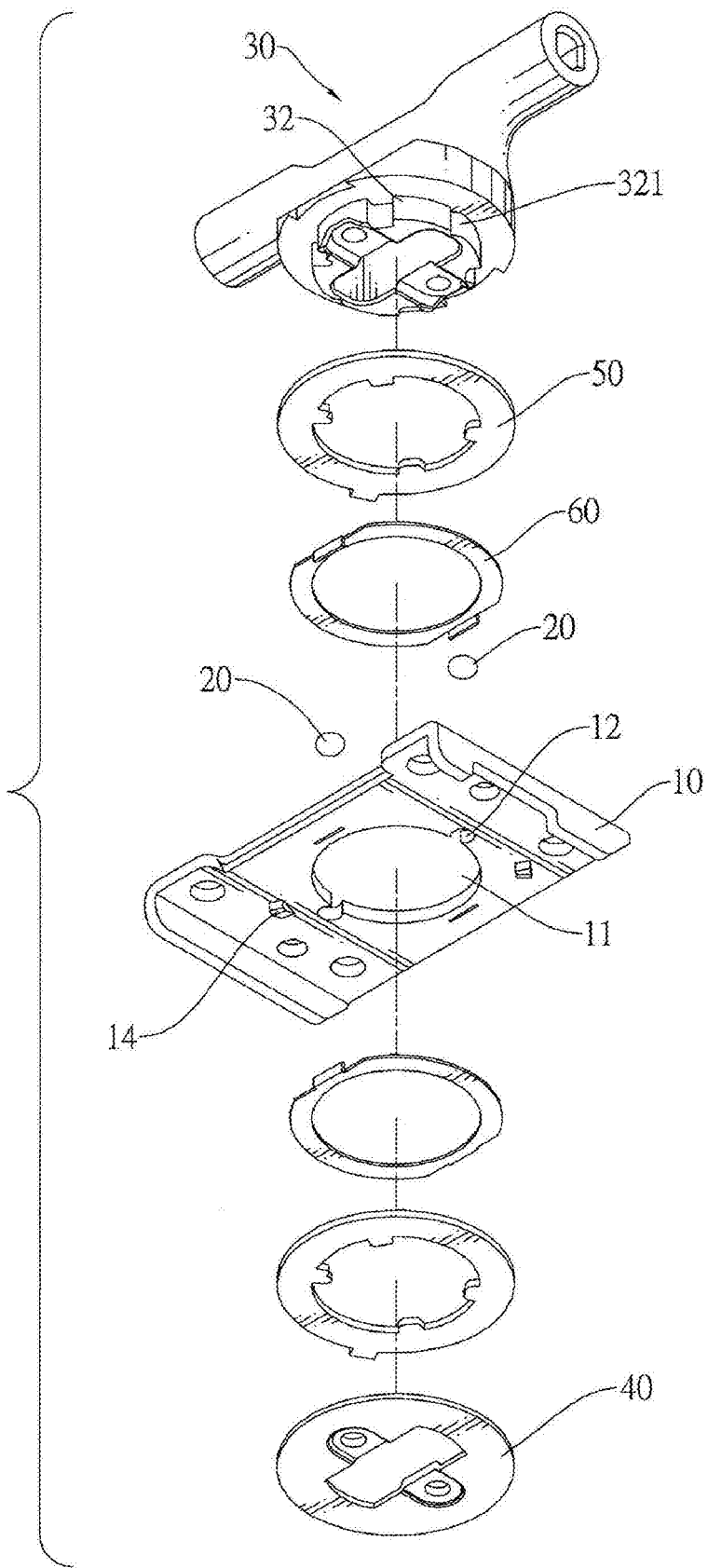
FIG. 3 is another exploded perspective view of the transverse-positioning hinge in FIG. 1.

With reference to FIGS. 2 and 3, the seat (10) has a central hole (11), an inside wall, two receiving recesses (12), two slits (13) and multiple stops (14). The inside wall is defined around the central hole (11). The receiving recesses (12) are formed in the inside wall and communicate with the central hole (11). The slits (13) are formed through the seat (10). The stops (14) are formed separately on a top surface and a bottom surface of the seat (10).

The central bracket (30) is connected pivotally to the seat (10) and has a body (31) and a shaft (32). The body (31) is located above the seat (10). The shaft (32) is formed on a bottom surface of the body (31), is mounted through the central hole (11) of the seat (10) and has two positioning detents (321). The positioning detents (321) are formed in an outside wall of the shaft (32).

The elastic balls (20) are mounted respectively in the receiving recesses (12) of the seat (10) and selectively engage the positioning detents (321) of the shaft (32). The sizes of the receiving recesses (12) and the elastic balls (20) may be adjusted as desired. In the preferred embodiment, the width of the receiving recess (12) is equal to or slightly larger than the width of the elastic ball (20), but the height of the receiving recess (12) is slightly smaller than the elastic ball (20). Therefore, when the elastic balls (20) are not pressed, the elastic balls (20) protrude out from the top and bottom surfaces of the seat (10). One side of the elastic ball (20) may protrude out from the receiving recess (12) to allow the elastic ball (20) to contact with the shaft (32). Furthermore, the width of the receiving recess (12) may be larger than the width of the elastic ball (20) to prevent the elastic ball (20) contacting with the shaft (32) before being pressed.

The fastening washer (40) is attached securely to an end of the shaft (32) and is located under the seat (10). The elastic balls (20) are clamped by the fastening washer (40) and the body (31) of the central bracket (30) so that the elastic balls (20) are deformed. Adjusting the clamping force between the fastening washer (40) and the body (31) of the central bracket (30) influences the deformation of the elastic balls (20) so that the elastic balls (20) provide different resilient forces.

The abrasion washers (50) are mounted around and rotated by the shaft (32), and are located respectively above and under the seat (10) to avoid the body (31) of the central bracket (30) directly rubbing against the seat (10). The abrasion washers (50) may be keyed around the shaft (32) to be rotated by the shaft (32). Each abrasion washer (50) has a limit (51) formed on an annular edge and selectively abutting the stops (14) of the seat (10) to limit the rotating angle of the shaft (32).

The pressed washers (60) are mounted around the shaft (32). The elastic balls (20) are clamped between the pressed washers (60). Each pressed washer (60) is mounted between one abrasion washer (50) and the seat (10) to avoid the abrasion washers (50) directly rubbing against the elastic balls (20) so that the elastic balls (20) are protected from abrasion. Each pressed washer (60) has two ears (61) formed on an annular edge and protruding through the slits (13) of the seat (10) to hold the pressed washers (60) and the seat (10) together. The pressed washers (60) do not rotate relative to the seat (10) but may move axially relative to the seat (10) to selectively press the elastic balls (20).

Figure 4:
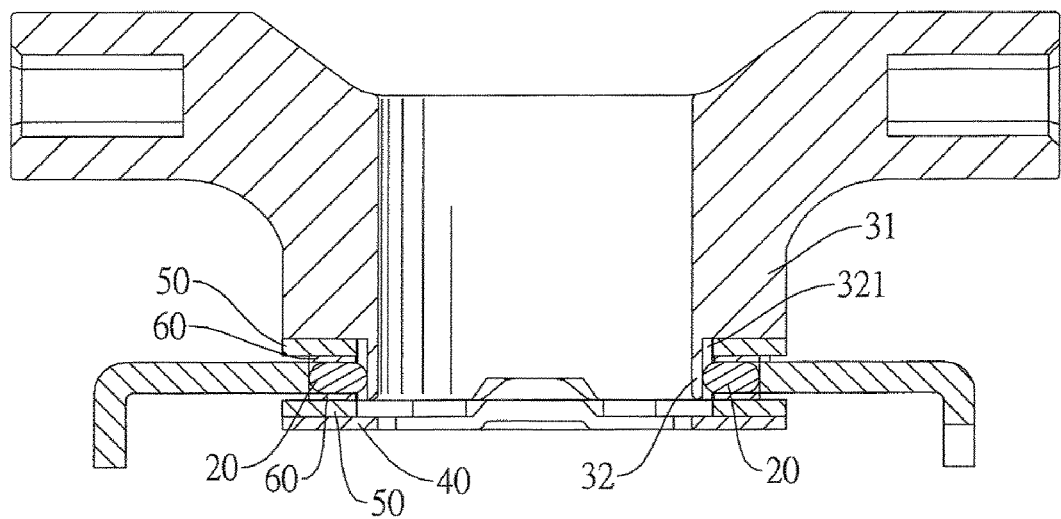
FIG. 4 is a side view in partial section of the transverse-positioning hinge in FIG. 1.
Figure 5:
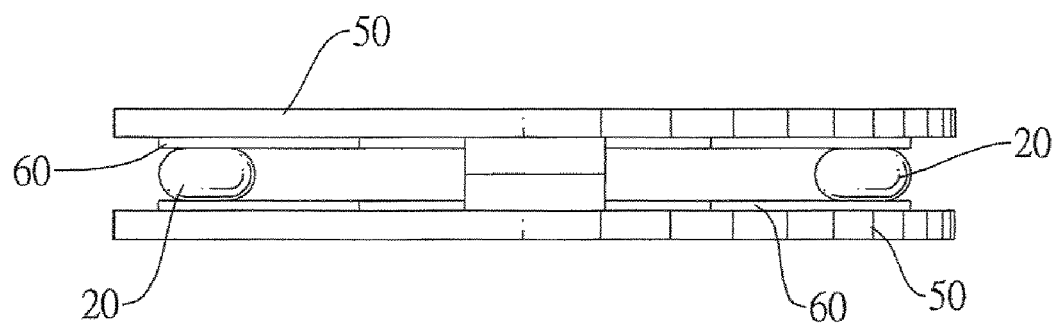
FIG. 5 is a side view of the elastic balls, the abrasion washers and the pressed washers of the transverse-positioning hinge in FIG. 1.

With reference to FIGS. 4 and 5, with the clamping of the pressed washers (60) and the abrasion washers (50), the elastic balls (20) are deformed and protrude into the central hole (11). When the shaft (32) is rotated relative to the seat (10) and the elastic balls (20), the elastic balls (20) selectively engage the positioning detents (321) of the shaft (32) to provide positioning function.

Furthermore, when the elastic balls (20) are pressed and the central bracket (30) is pivoted relative to the seat (10), the shaft (32) continually rubs against the elastic balls (20). The receiving recesses (12) may be large enough for the elastic balls (20) to revolve in the receiving recesses (12). Therefore, abrasion of the elastic balls (20) rubbing against the shaft (32) is changed to avoid damage.

The transverse-positioning hinge as described has following advantages. With adjusting the tightness for fastening the fastening washer (40), the clamping forces to the elastic balls (20) are changed so that the deformations of the elastic balls (20) are different. Therefore, the resilient forces provided by the elastic balls (20) are adjusted by adjusting the tightness of fastening the fastening washer (40). Then the positioning forces provided by engagement between the elastic balls (20) and the shaft (32) are also adjusted by the resilient forces provided by the elastic balls (20). Thus, the positioning force of the transverse-positioning hinge as described is easily adjusted by adjusting the tightness of fastening the fastening washer (40) without manufacturing different elastic balls (20).

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A transverse-positioning hinge comprising
    a seat having
       a central hole;
       an inside wall defined by and around the central hole; and
       at least one receiving recess formed in the inside wall and communicating with the central hole;
    at least one elastic ball, each of the at least one elastic ball mounted in one of the at least one receiving recess of the seat;
    a central bracket connected pivotally to the seat and having a body; and
       a shaft formed on the body, mounted through the central hole of the seat and having a positioning detent selectively engaging the at least one elastic ball; and
    a fastening washer attached to an end of the shaft, wherein the at least one elastic ball is clamped between the fastening washer and the body of the central bracket.

2. The transverse-positioning hinge as claimed in claim 1 further comprising two pressed washers mounted around the shaft and located respectively above and under and held by the seat, wherein the at least one elastic ball is clamped between the pressed washers.

3. The transverse-positioning hinge as claimed in claim 2, wherein
    the seat has two slits formed therethrough; and
    each pressed washer has two ears formed on an annular edge thereof and protruding through the slits of the seat.

4. The transverse-positioning hinge as claimed in claim 3 further comprising two abrasion washers, wherein
    the abrasion washers are mounted around and are rotated by the shaft and are located respectively above and under the seat; and
    each pressed washer is mounted between one abrasion washer and the seat.

5. The transverse-positioning hinge as claimed in claim 4, wherein
    the seat has multiple stops formed separately on a top surface and a bottom surface of the seat; and
    each abrasion washer has a limit formed on an annular edge thereof and selectively abutting the stops of the seat.

6. The transverse hinge as claimed in claim 3, wherein the seat has two of the receiving recesses.

7. The transverse hinge as claimed in claim 6 comprising two of the elastic balls.

8. The transverse hinge as claimed in claim 4, wherein the seat has two of the receiving recesses.

9. The transverse hinge as claimed in claim 8 comprising two of the elastic balls.

10. The transverse hinge as claimed in claim 2, wherein the seat has two of the receiving recesses.

11. The transverse hinge as claimed in claim 10 comprising two of the elastic balls.

12. The transverse-positioning hinge as claimed in claim 2 further comprising two abrasion washers, wherein
    the abrasion washers are mounted around and are rotated by the shaft and are located respectively above and under the seat; and
    each pressed washer is mounted between one abrasion washer and the seat.

13. The transverse-positioning hinge as claimed in claim 12, wherein
    the seat has multiple stops formed separately on a top surface and a bottom surface of the seat; and
    each abrasion washer has a limit formed on an annular edge thereof and selectively abutting the stops of the seat.

14. The transverse hinge as claimed in claim 13, wherein the seat has two of the receiving recesses.

15. The transverse hinge as claimed in claim 14 comprising two of the elastic balls.

16. The transverse hinge as claimed in claim 12, wherein the seat has two of the receiving recesses.

17. The transverse hinge as claimed in claim 16 comprising two of the elastic balls.

18. The transverse hinge as claimed in claim 1, wherein the seat has two of the receiving recesses.

19. The transverse hinge as claimed in claim 18 comprising two of the elastic balls.

* * * * *